United States Patent

Boswell et al.

[11] 4,019,807
[45] Apr. 26, 1977

[54] REFLECTIVE LIQUID CRYSTAL LIGHT VALVE WITH HYBRID FIELD EFFECT MODE

[75] Inventors: Donald D. Boswell, Granada Hills; Jan Grinberg, Los Angeles; Alexander D. Jacobson, Topanga; Gary D. Myer, Reseda, all of Calif.

[73] Assignee: Hughes Aircraft Company, Culver City, Calif.

[22] Filed: Mar. 8, 1976

[21] Appl. No.: 664,776

[52] U.S. Cl. .................. 350/160 LC; 250/213 R
[51] Int. Cl.² ........................................... G02F 1/13
[58] Field of Search ............. 350/150, 160 LC; 250/213 R

[56] References Cited
UNITED STATES PATENTS

| | | | |
|---|---|---|---|
| 3,744,879 | 7/1973 | Beard | 350/162 SF |
| 3,824,002 | 7/1974 | Beard | 350/160 LC |
| 3,915,554 | 10/1975 | Malzawa | 350/160 LC |

*Primary Examiner*—Edward S. Bauer
*Attorney, Agent, or Firm*—Donald C. Keaveney; W. H. MacAllister

[57] ABSTRACT

There is disclosed a high performance reflective mode liquid crystal light valve suitable for general image processing and projection and particularly suited for application to real-time coherent optical data processing. A preferred example of the device uses a CdS photoconductor, a CdTe light absorbing layer, a dielectric mirror, and a liquid crystal layer sandwiched between indium-tin-oxide transparent electrodes deposited on optical quality glass flats. The non-coherent light image is directed onto the photoconductor; this reduces the impedance of the photoconductor, thereby switching the AC voltage that is impressed across the electrodes onto the liquid crystal to activate the device. The liquid crystal is operated in a hybrid field effect mode. It utilizes the twisted nematic effect to create a dark off-state (voltage off the liquid crystal) and the optical birefringence effect to create the bright on-state. The liquid crystal thus modulates the polarization of the coherent read-out or projection light responsively to the non-coherent image. An analyzer is used to create an intensity modulated output beam.

10 Claims, 15 Drawing Figures

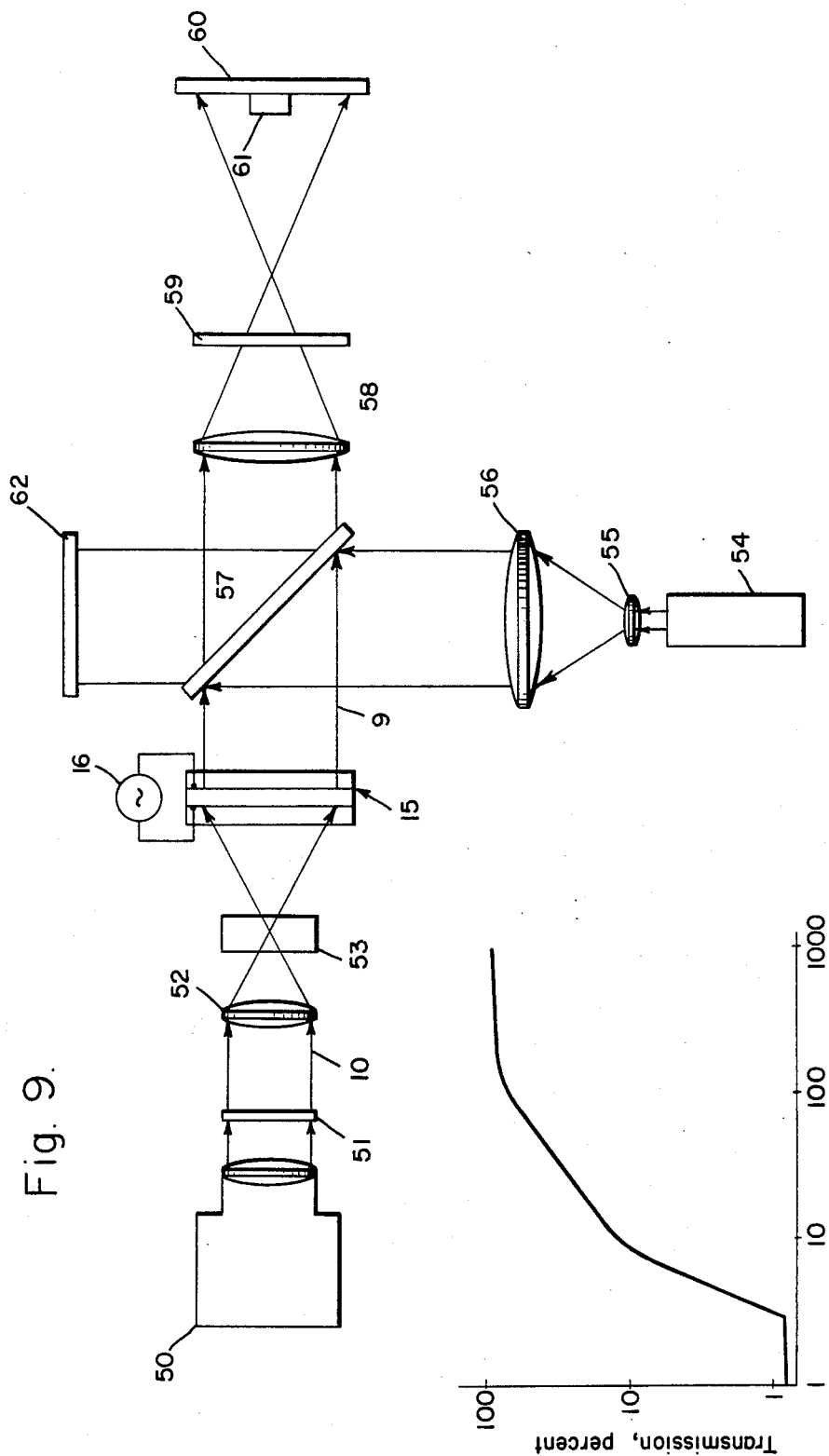

REFLECTIVE LIQUID CRYSTAL LIGHT VALVE WITH HYBRID FIELD EFFECT MODE

The invention described herein was made in the performance of work under NASA Contract No. NAS5-23192 and is subject to the provisions of Section 305 of the National Aeronautics and Space Act of 1958 (72 Stat. 435; 42 U.S.C. 2457).

CROSS-REFERENCE TO RELATED COMMONLY OWNED APPLICATIONS AND PATENTS

The present invention is an improvement over the inventions shown in U.S. Pat. No. 3,744,879 issued to T. D. Beard on July 10, 1973, U.S. Pat. No. 3,824,002 issued to T. D. Beard on July 16, 1974, and over the invention shown in the copending application of William P. Bleha, Jan Grinberg, Joseph Jenney and Gary D. Myer Ser. No. 538,381 filed on Jan. 6, 1975 and entitled "Photoactivated Liquid Crystal Field Effect Light Valve Display Device". This invention may also use, but does not require, the photodetector of U.S. Pat. application Ser. No. 625,331, now U.S. Pat. No. 3,976,361, field Oct. 22, 1975 on behalf of L. M. Fraas and W. P. Bleha Jr. entitled "Charge Storage Diode With Graded Defect Density photocapacitive Layer". The light valve of this invention may be used in the system of the copending application Serial No. 664,777 concurrently filed herewith by the same inventors on Hughes Docket PD-76035 entitled "Optical Data Processing System With Reflective Liquid Crystal Light Valve". All of the above are assigned to the assignee of the present application.

FIELD OF THE INVENTION

This invention pertains generally to electro-optical phenomena in liquid crystal devices and in particular to reflective light valve display devices which utilize such phenomena in a hybrid field effect mode suitable for optical data processing.

BACKGROUND OF THE INVENTION

The science and technology of coherent optical data processing (CODP) has existed as a recognized discipline since the early 1950's when the following authors and others published in the initial concepts upon which the field is now based. such authors include:
1. D. Gabor, Mass. Inst. of Tech., Electronics Research Laboratory Tech. Rep. No. 238 (1952).
2. E. L. O'Neill, I.R.E. Trans. on Infor. Theory, IT-2, Pg. 56 (1956).
3. A. Blank Lapierre, Symposium on Microwave Optics, McGill Univ., Montreal, Canada, Pg. 46 (1953).
4. P. Elias, et al, J. Opt. Soc. Am. 42, Pg. 127 (1952).
5. P. M. Duffieux, L'Integrable de Fourier et ses Applications a L'Optique, Faculte des Sciences, Besancon, France (1946 ).
6. A. Marachal and P. Croce, compte rendu, 237, Pg. 607 (1953).
7. L. Cutrona, et al, IRE Trans. on Infor. Theory, IT-6, Pg. 386 (1960 ).

The above noted U.S. Pat. No, 3,744,879 to T. D. Beard describes a more recent implementation of a coherent optical data processor using a transmissive liquid crystal light valve as a spatial filter to control transmissivity of coherent light through the processor. Not only is the Beard liquid crystal light valve transmissive rather than reflective, but also it relies on the dynamic scattering mode which has not proven as satisfactory in operation as the hybrid field effect mode to be described herein.

The promise of CODP, from the start, has been to perform data processing in many parallel processing channels simultaneously and quickly. Thus it was regarded to be an alternative to the serially organized electronic digital computer, particularly suited to the processing of two-dimensional data bases such as photographic images of multi-channel, wide bandwidth electronic signals. Despite its obvious advantages, CODP has not been regarded as a general purpose data processing technology. Inherently, CODP is a linear, analog process. For these reasons, and because the physical components and subsystems that implement these processes are non-programmable, CODP is substantially less flexible than is the electronic digital computer. As a result, CODP is best implemented in the form of special purpose processing hardware.

There exists many problem areas than can make use of such a special purpose processing capability. Unfortunately, few have heretofore benefited from the potentials of CODP. One of the principle reasons is that CODP, as it has heretofore been practiced, cannot be performed in real time. Speed of data through-put is a basic requirement for a special purpose data processor. Yet CODP, because of its historic reliance on photographic film both for inputting data and for use as a spatial filter, has been an off-line process. This is also true of the Beard device which relies on a Transparency, 60, for inputting a signal image. Thus CODP has suffered the worst of both processing worlds - - limited flexibility and off-line operation.

The light valve device of the present invention can resolve this dilemma by providing a high performance, real time non-coherent light image converter. The device may be used to input images in real-time from non-coherently illuminated scenes to the spatially coherent illumination of the CODP. The device may, of course, also be used in other image processing and projecting systems known to the prior art and not specifically intended for data processing applications.

SUMMARY OF THE INVENTION

The reflective mode liquid crystal light valve device of the present invention is a special adaptation of the AC photoactivated liquid crystal light valve described in U.S. Pat. No. 3,824,002 to T. D. Beard and in the above-identified copending patent application of William Bleha et al. Basically, the device consists of a sandwich of thin films that electrically control the optical birefringence of a thin (approximately 2 micrometer) liquid crystal layer. The device has high resolution (greater than 100 lines per millimeter limiting resolution), high contrast (greater than 100 to 1), high speed (10 milliseconds, on; 15 milliseconds, off) and high input sensitivity (approximately 0.3 ergs per square centimeter at threshold). Moreover, it has several practical advantages. It is compact (solid state), low power (several milliwatts), inexpensive to manufacture (thin film technology), and operates from a single low voltage (5–10 volts rms) power supply. In a single device the invention combines two effects in liquid crystal phenomena, namely the rotation of polarization state by the twisted nematic alignment in the off-state of the device and the birefringence of the tilted molecules in the on-state of the device. The use of this hybrid field effect mode by contrast to the dynamic scattering mode permits the use of a very thin layer of liquid crystal which results in very fast response which is crucial for optical data processing systems. The above mentioned hybrid field effect mode combines this high speed with high contrast. This hybrid field effect mode is achieved by providing the two micrometer thick liquid crystal layer with a twist angle which is less than the heretofore known 90° twist or spiral. This angular relationship is determined by prefabrication of alignment means in each of the two insulating layers confining the liquid crystal material in such a fashion that the two opposed faces have alignment directions which if projected to any plane between and parallel to the two faces intersect at an acute angle. The birefringence of the tilted molecules in the on-state when an electric field is applied across the liquid crystal layer may be further enhanced by illuminating the cell with an off-axis projection beam. When the incident light angle is other than perpendicular the effective birefringence is not zero even when the alignment is ideal homeotropic (which is defined as an alignment in which the long axis of the molecules is oriented perpendicular to the electrode surfaces and which may be produced by application of an appropriate electric field). On the other hand, no significant change is observed in the twisted nematic behavior if the incident light beam angle deviates from the normal to the liquid crystal layer by less than 20° or 30°. Such a hybrid filed effect cell using a 45° twist angle for the twisted nematic aligment to control polarization by the rotation effect in the off-state and using off-axis incident projection light to take advantage of tilt of the molecules resuling in control of polarization state by the birefringence effect in the on-state of the device results in a liquid crystal cell having very good contrast and high speed sufficient for real time use in optical data processing and other applications.

BRIEF DESCRIPTION OF THE DRAWINGS

These and other objects, features and advantages of the invention will be more fully understood from the following detailed description of a preferred exemplary embodiment taken in conjunction with the accompanying drawings wherein like reference characters refer to like parts throughout and in which:

FIG. 9 is a schematic diagram of a coherent optical data processing system in which the device of the present invention may be used.

FIG. 10 is a sensitometry curve comprising a graph of percent transmission versus input light intensity for the hybrid field effect light valve of the present invention which may be used in the system of FIG. 9.

DETAILED DESCRIPTION OF THE INVENTION

Figure 1:
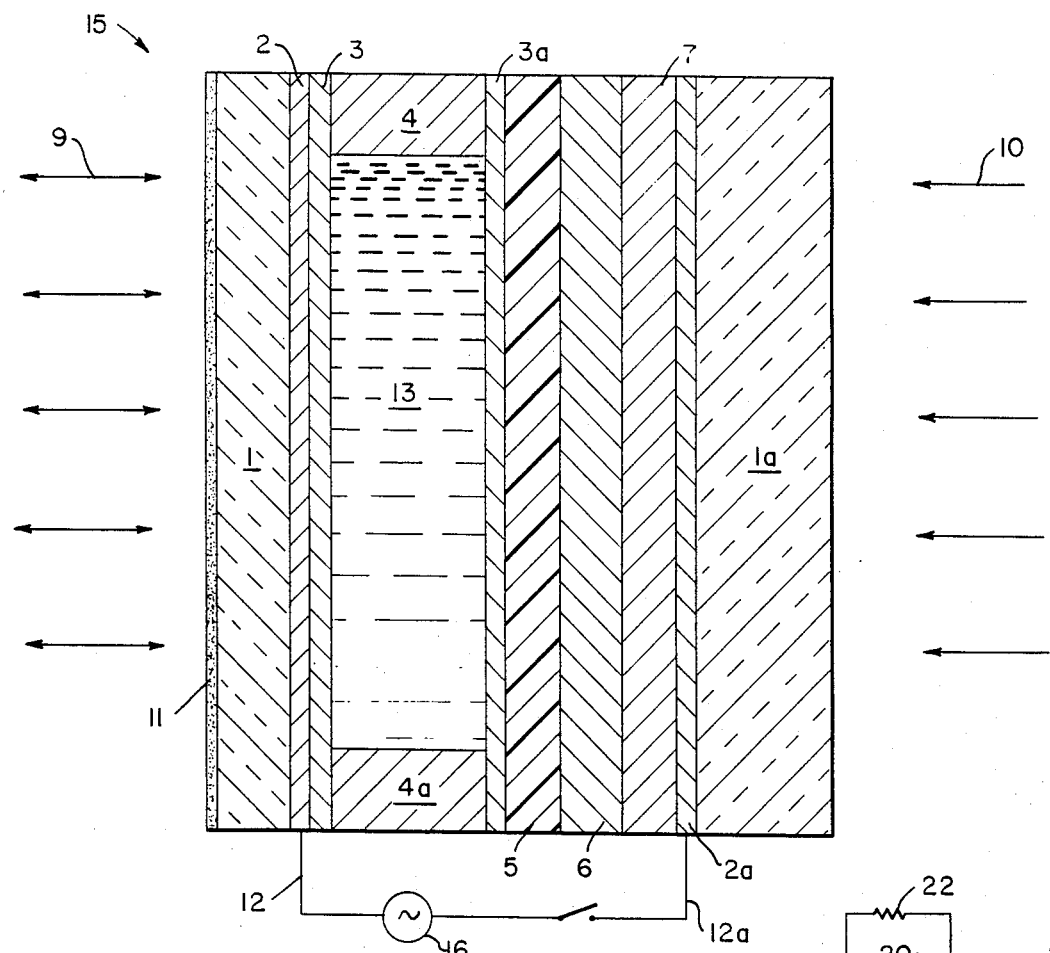
FIG. 1 is substantially a reproduction of FIG. 1 in U.S. Pat. No. 3,824,002 issued to Terry Beard on July 16, 1974 showing a sectional view of a prior art light valve of the type which may be modified for use in the present invention.

There is shown in FIG. 1 a cross-sectional view of the light valve showing the general configuration of this device as used in the present invenion. Actually, the showing of FIG. 1 is substantially a reproduction of FIG. 1 in U.S. Pat. No, 3,824,002 issued to Terry D. Beard on July 16, 1974. The device as used in the present invention has substantially the same structural configuration as the Beard device, but is modified in the manner in which the alignment means for the molecules of the nematic liquid crystals are arranged in the device and in the mode of operation resulting therefrom. Also, the present device uses positive dielectric anisotrophy in contrast to the negative dielectric anisotropy nematic liquid crystals used in the Beard device. This makes the change of alignment possible.

The complete description of the structure of the device of FIG. 1 and its mode of operation in the dynamic scattering mode is set forth in the Beard patent. Briefly, it will be noted that the AC light valve 15 consists of a number of thin film layers sandwiched between two glass substrates 1 and 1a. A low voltage (5 to 10 volts rms) audio frequency power supply 16 is connected by leads 12 and 12a through switch 14 to the two outer, thin film indium-tin-oxide (ITO) transparent electrodes 2 and 2a. Thus the power supply is connected across the entire thin film sandwich. The cadmium sulfide photoconductor layer 7 and the light blocking cadmium telluride layer 6 combine to create a rectifying heterojunction. The dielectric mirror 5 and the blocking layer 6 separate the photoconductor 7 from the read-out light beam 9. This is a major design feature of the AC light valve. It enables simultaneous writing by writing or input light beam 10 and reading of the device without regard to the spectral composition of the two light beams 9 and 10. Furthermore, the dielectric mirror prevents the flow of DC current through the liquid crystal. This enhances the lifetime of the device. Finally, the dielectric mirror 5 can be designed to reflect any portion of the visible spectrum thereby optimizing the ability of the mirror to separate beams 9 and 10, and at the same time, maximizing the reflectivity of the device. This, together with the chemically inert $SiO_2$ insulating layers 3 and 3a which bound the liquid crystal layer 13 ensures a very long lifetime for the device. The liquid crystal used in this device is typically a nematic material such as a biphenyl which is held in the space defined by the two insulating layers 3 and 3a and the spacers 4 and 4a which are employed to maintain a suitable gap between the insulating films.

Figure 2A:
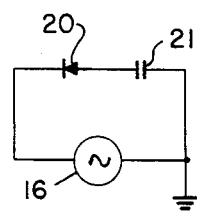
FIGS. 2a and 2a are respectively a circuit diagram showing an equivalent circuit and a diagram of voltage waveforms of an ideal AC light valve substrate of the type shown in FIG. 1 in the absence of illumination.
Figure 2B:
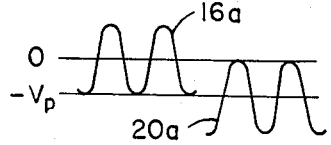

In FIG. 2a there is shown an equivalent circuit diagram of an ideal light valve substrate of the type shown in FIG. 1. The diode 20 represents the heterojunction diode between the layers 6 and 7, and the capacitor 21 represents the capacitance of the dielectric mirror 5. The circuit is drawn for the case of not input illumination light to the photoconductor. When the AC voltage power supply 16 is connected to such a circuit, the capacitor 21 is charged to the negative peak voltage ($-V_p$) of the power supply during the first cycle by power supply voltage 16a shown in FIG. 2b. This voltage then serves as a backbias voltage on the diode for all values of the sinusoidal varying power supply voltage. Assuming infinite back resistance for the diode, the steady-state current flow in this circuit will be zero, independent of the frequency, waveform (providing it is periodic), and amplitude of the power supply voltage. Thus there will be no current flow in the nonilluminated resolution element of the ideal AC light valve, and the diode voltage will be as shown in waveform 20a in FIG. 2b.

Figure 3A:
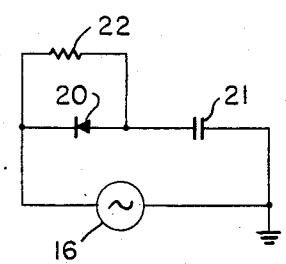
FIGS. 3a and 3b are respectively an equivalent circuit diagram and a diagram of voltage and current waveforms of an ideal AC light valve substrate in the presence of illumination.
Figure 3B:
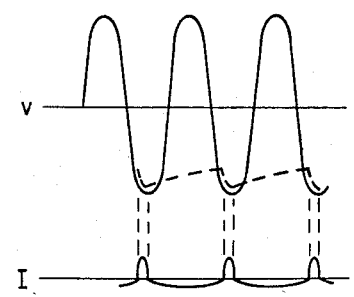

Now, let us consider what happens in an illuminated element. In the case of the idealized circuit shown in FIG. 3a, the incident photons introduce a leakage resistance 22 across the diode 20; this resistance discharges the capacitor 21 during the back-bias cycle of the diode. The approximate waveforms are shown in FIG. 3b. If the current is high enough, the liquid crystal in the illuminated element will be driven above its electrooptic threshold by the field developed across it. This effect can then be read out by the projection beam.

Figure 4:
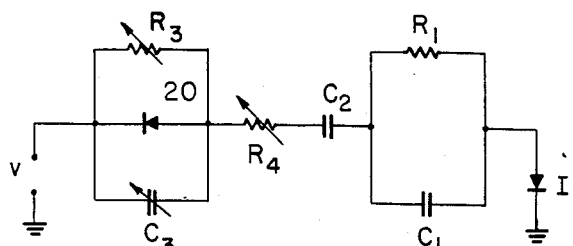
FIG. 4 is an equivalent circuit of an actual complete AC light valve.

A more realistic equivalent circuit of the AC light valve is shown in FIG. 4. In this circuit $R_1$ and $C_1$ represent the resistance and capacitance, respectively, of the liquid crystal, $C_2$ the capacitance of the mirror, $R_4$, ($R_3 + R_4$) and $C_3$ represent respectively the forward resistance, back resistance and the capacitance of the diode. In deriving this circuit we assume that the leakage resistance of the mirror, $R_2$, is very high which means that $R_2 C_2 \omega$ is much greater than 1 where $\omega$ is the basic frequency of the power supply, so that we can neglect the influence of $R_2$ on the circuit. Hence $R_2$ is not shown. Unlike the idealized circuit, a substrate that is represented by the circuit shown in FIG. 4 will pass current when the photoconductor is not illuminated, as well as when it is. In this circuit, the illumination decreases the values of $R_3$ and $R_4$, and increases the capacitance $C_3$ (due to a photocapacitance effect in the junction). As a result the current flow in the illuminated element is larger than in the nonilluminated element. It is this difference in the current flow that provides us with means for controlling the liquid crystal electro-optic effect with the photoconductor. So, the substrate has to be designed in such a fashion that the current flow in the nonilluminated element is less then the liquid crystal threshold level, and in the illuminated element is above the threshold by the desired amount. Generally speaking, our goal is to maximize this current ratio, which we call the switching ratio of the devie, since this ratio determines the photoelectric efficiency of the light valve. It has been found that switching ratios vary between 1.1 and 2.1 for input light intensity levels from 10 microwatts per square centimeter to saturation with a value of 1.8 for the switching ratio at 400 microwatts per square centimeter. At these latter values the excitation and decay times in milliseconds were 10 and 30 respectively.

The AC light valve is inherently a multi-purpose device. Its different functions are realized by changing the manner in which the liquid crystal is applied to and used in the device. Liquid crystals exhibit several different electro-optic effects. These include dynamic scattering and two separate field effects which are respectively called optical birefringence and the twisted nematic effect. Dynamic scattering is described, for example, by G. H. Heilmeier, L. A. Zanzoni, and L. A. Barton in the proceedings of the IEEE Vol. 56 page 1162 (1968) and in the IEEE Transactions of Electron Devices, Vol. Ed-17, Page 22 (1970 ). The optical bifringence effect is described in the following references: M. F. Schiekel and K. Fahrenschon, Applied Physics Letters, Vol. 19 page 391 (1972); F. J. Kahn, Applied Physics Letters, Vol. 20 page 199 (1972); and R. A. Soref and M. J. Rafuse, Journal of Applied Physics, Vol, 43 page 2029 (1972). The twisted nematic effect has been described in the following references: M. Schadt and W. Helfrich, Applied Physics Letters, Vol. 19 page 127 (1971); A. Boller, M. Scherrer and M. Schadt, Proceedings of the IEEE Vol. 60 page 1002 (1972).

Also, U.S. Pat. No. 3,625,591, in the name of Marvin J. Freiser and Ivan Holler, entitled "Liquid Crystal Display Element", and assigned to IBM Corporation discloses a cell having a nematic liquid crystal which in it quiescent state (in the absence of an electric field) has all its molecules aligned parallel to a given direction along which the cell's electrodes have been rubbed. According to the teachings of that patent, when a low voltage AC source is applied across the electrodes, th liquid crystal conducts current which produces a chaotic redistribution of the molecules of the liquid crystal film, which in turn, serves to depolarize the light. By means of cross polarizers this redistribution may be made visible to an observer. Finally, U.S. Pat. No. 3,731,,986, in the name of James L. Ferguson, entitled "Display Devices Utilizing Liquid Crystal Light Modulation", and assigned to Internal Liquid Xtal Company, discloses a bistable device utilizing nematic liquid crystal such that the long axis of the nematic material is oriented in a helical manner from the first electrode to the second electrode. upon the application of a threshold voltage, the structure will untwist. The use of positive dielectric anisotrophy materials is taught in that patent.

For a variety of reasons none of these effects by itself is directly suited for the present application of the AC light valve. To obtain the performance characteristics that will be described below we have developed a hybrid field effect mode - - one that uses a modification of the conventional twisted nematic effect in the off-state (no voltage on the liquid crystal) and the pure optical birefringence effect of the liquid crystal in the on-state (voltage on the liquid crystal).

Figure 5A:
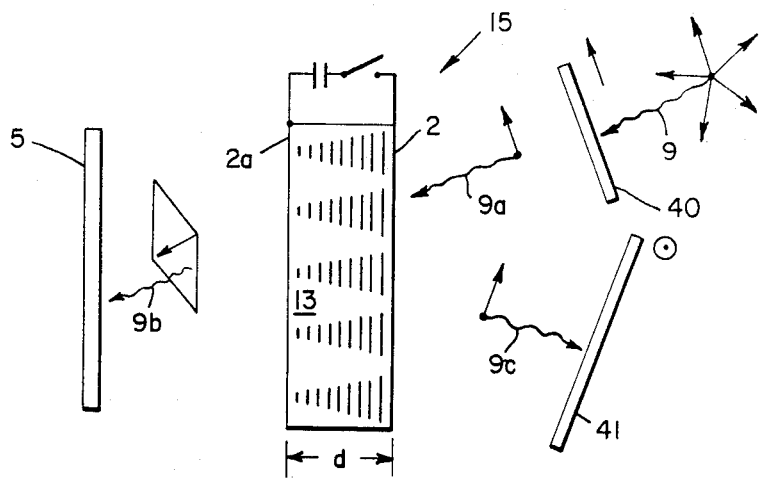
FIG. 5a and 5b are diagrammatic showings of the type of twisted nematic liquid crystal configuration used in the off state of the light valve of FIG. 1 in accordance with the present invention.
Figure 5B:
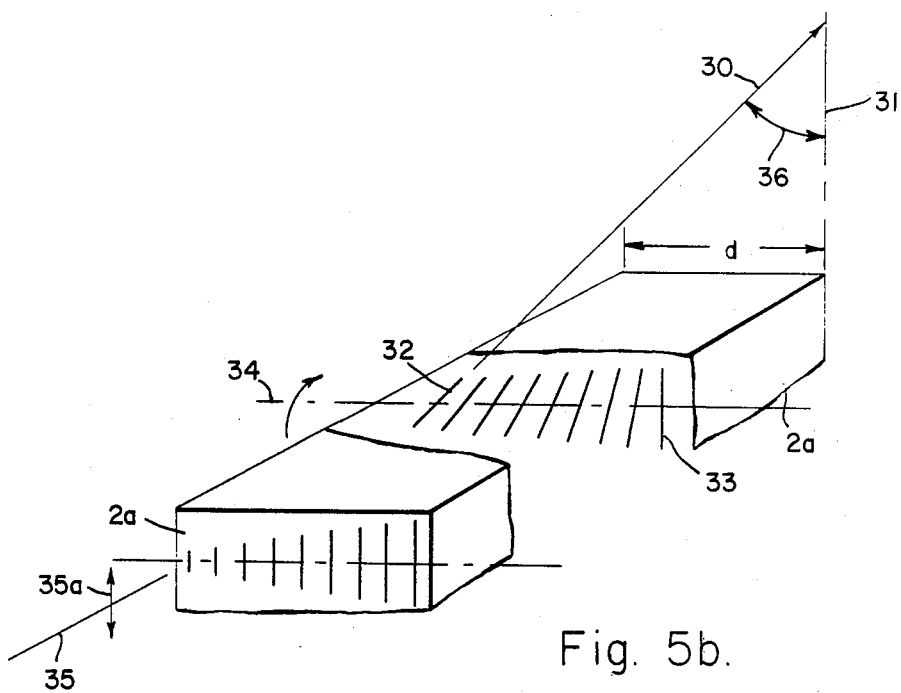

To implement this hybrid electro-optic effect, we fabricate the liquid crystal layer in a twisted alignment configuration; the liquid crystal molecules at the electrodes are aligned with their long axes parallel to the electrode surfaces. In addition, they are aligned to lie parallel to each other along a preferred direction that is fabricated into each electrode surface of the device. The twisted alignment configuration is obtained by orienting the preferred directions on the two parallel opposed electrode surfaces such that the respective projections of the first and second directions associated respectively with the first and second electrodes in any plane which is between and parallel to both said electrode planes intersect at an acute angle for producing a twisted alignment of the axes of the nematic liquid crystal molecules as one progresses along the perpendicular axes to the two electrodes. That is to say, as may be best seen in FIG. 5b, the direction of the arrow 30 in the plane of electrode 2a represents the alignment direction for molecules such as the molecules having axes 32 immediately adjacent and parallel to the electrode 2a whereas the arrow 31 in the plane of electrode 2 represents the direction of alignment for molecules such as the molecules having axes 33 which are immediately adjacent and parallel to the plane of electrode 2. The intermediate molecules have their axes gradually rotated about imaginary line or axis 34 which is perpendicular to electrode 2 and 2a from the angular position of arrow 30 to the relative angular position of arrow 31 as one progresses across the liquid crystal layer from electrode 2 to electrode 2a. It will be noted that, purely for convenience of illustration, the relative positions of the electrodes 2 and 2a have been reversed as between left and right in the diagramatic views at FIGS. 5a, 5b, 6a, and 6b from the structural showing of FIG. 1. It will also be understood, of course, that FIGS. 5b and 6b, are broken diagrammatic view which shown on an enlarged scale only one small cross sectional element of the homogeneous liquid crystal layer 13 shown in cross section in FIGS. 5a and 6a.

In the conventional twisted nematic effect devices mentioned above, the angle 36 between the projection of arrows 30 and 31, or, more precisely, the angle between the projections of these arrows in any common plane parallel to the electrodes in which the two lines or directions would intersect, has been 90°. In the present hybrid device it will be explained below why it is necessary to use an acute angle which, in a preferred device, is substantially 45°. As maya be seen in FIG. 5b, molecules in the bulk of the liquid crystal layer rotate through this angle between the two direction arrows 30 and 31 in traversing the space between the electrodes 2 and 2a. This twisted alignment configuration. combined with the intrinsic optical birefringence of the liquid crystal, causes th polarization direction of linearly polarized incident light to rotate exactly through the twist angle. This is the so-called twisted nematic effect. In conventional twisted nematic devices the twist angle is 90°. As described below, in the device under discussion here, we twist the molecules through 45°.

In order to introduce these preferred homogeneous alignment directions any prior art alignment technique may be used. We have, for example, found it advantageous to introduce a preferred direction by preparing the substrate surfaces in contact with the liquid crystal material in accordance with previously developed alignment techniques such as sallow angle ion beam etching. Grazing angle deposition of the passivating layers 3 and 3a can also be used as can mechanical rubbing in the manner taught by U.S. Pat. No. 3,625,591 issued in the name of Marvin J. Freiser and Ivan Holler, entitled "Liquid Crystal Display Element" and assigned to IBM Corporation. However, the particular method used for obtaining the desired alignment does not per se form a part of the present invention which is directed rather to the hybrid electro-optic effect in a device suitable for optical data processing systems.

To understand the operation of the hybrid field effect mode, first consider the off-state. As shown in FIG. 5a, we place a crossed polarizer/analyzer pair, 40 and 41 respectively, between the light valve 15 and the source of the unpolarized readout light 9. The polarizer 40 is placed in the incident beam and the analyzer 41 is placed in the reflected beam from dielectric mirror 5, which is here shown separate for convenience of illustration. This provides a dark off-state, because after its' first pass through the liquid crystal layer 13 the direction of polarization of the linearly polarized incident light 9a is rotated by 45° as shown at 9b. But upon reflection from the dielectric mirror 5, the light passes a second time through the liquid crystal and its polarization as shown at 9c is rotated back to the direction of the incident light, where it is blocked by the crossed analyzer 41. Thus the low transmission of the off-state of the device is determined entirely by the twisted nematic effect.

Figure 6A:
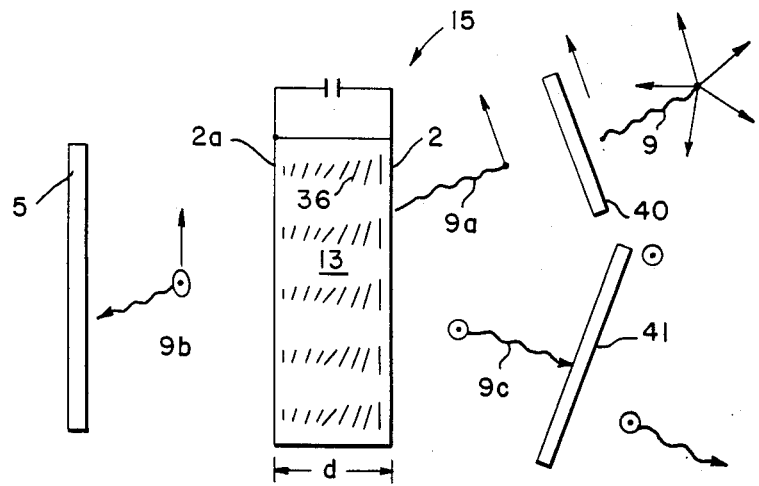
FIGS. 6a and 6b are diagrammatic views illustrating the operation of the hybrid field effect device of the present invention in the tilted mode used in the on-state of the electric field.
Figure 6B:
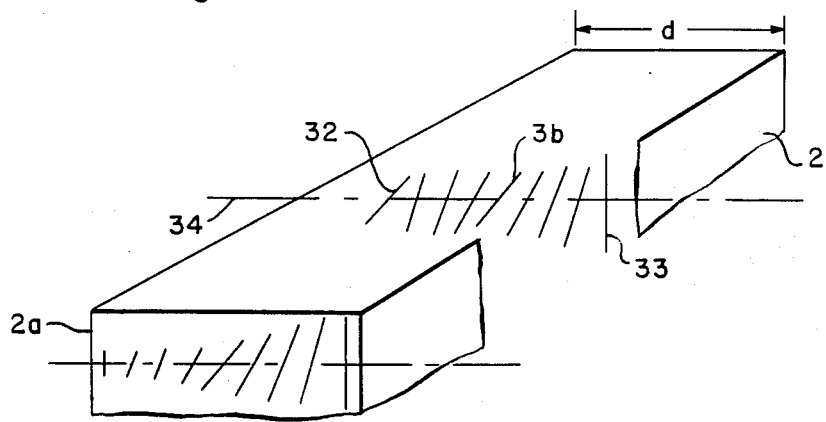
Figure 7A:
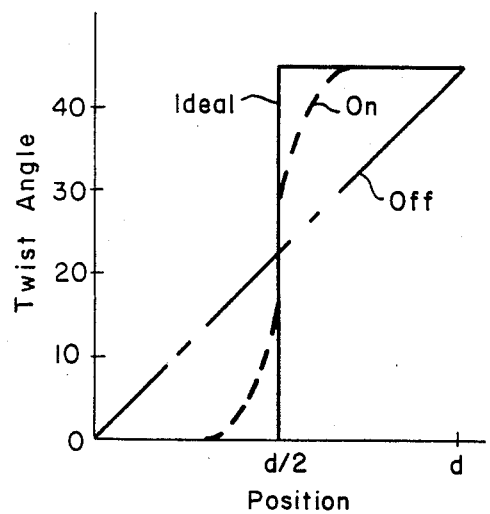
FIGS. 7a and 7b are graphs illustrating calculated values of molecule orientation as a function of position across the liquid crystal layer, the graph in FIG. 7a showing values for the twist angle and the graph in FIG. 7b showing values for the tilt angle.
Figure 7B:
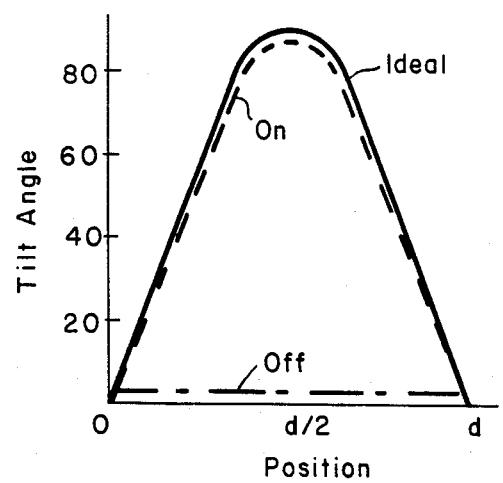

The on-state shown diagrammatically in FIGS. 6a and 6b is more complicated. If we apply voltage and rotate the molecules to the homeotropic alignment in which the long axes of the molecules are oriented perpendicular to the electrode surfaces and parallel to the direction of light propagation, the polarization of the light would be unaffected by the liquid crystal and we would have a dark on-state as well. This would be of no value. Closer scrutiny of the process whereby the molecules untwist, however, show that between full "off" and full "on" there exists a voltage regime where the device will transmit light. As the voltage is applied to the liquid crystal the molecules begin to tilt toward the normal to the electrode surface as illustrated diagrammatically for molecules 36 in FIGS. 6a and 6b. In this orientation of the molecules, between parallel and perpendicular, the optical birefringence of the molecules can affect the polarization of the light. As a result, at these intermediate voltages the light that emerges from the device after reflection from the mirror 5 becomes elliptically polarized, so that some transmission can occur. The question is, how much To answer the question, let us consider the orientation of the molecules as a function of position across the thickness "d" of layer 13 with voltage applied to the device. FIGS. 7a and 7b respectively shon calculated values for the twist angle and for the tilt angle of the molecules as a function of position within the liquid crystal layer for a twisted alignment configuration device. By "twist angle" is here meant the angle of rotation from the vertical about axis 34 in FIGS. 5b and 6b. By "tilt angle" is here means the angle of rotation from the plane defined by the vertical shown by arrow 35a and axis 35 in FIG. 6b. In both FIGS. 7a and 7b the position of the molecule as one traverses the distance "d" across the liquid crystal bewtween the two electrodes 2 and 2a is plotted horizontally along the X axis, the point midway between the two electrodes being shown as d/2. In FIG. 7a the Y axis shows twist angle so that this angle is plotted as a function of the distance. In FIG. 7b the Y axis shows tilt angle so that FIG. 7b is a plot of tilt angle as a function of distance. As shown in FIG. 7a, the effect of the voltage is to destroy the twist spiral. In the ideal case, with voltage on, half the molecules in the layer adopt the preferred alignment direction associated with one electrode and the other half adopt the alignment direction associated with the other electrode. The "voltage on" case is indicated by the uniformly dashed curved line. The "voltage off" case is indicated by the long and short dash line. The ideal case in which the molecules divide half and half is indicated by the solid vertical line.

There is a realizable voltage regime in which the practical twist angle distribution of a twisted nematic device is close to this ideal distribution. The physical explanation for this behavior is believed to be as follows. The twist of the molecules is transmitted from layer to layer by means of "long" range intermolecular alignment forces that are inherent in the liquid crystal. Generally speaking, as the tilt angle of the molecules grows (towards the perpendicular), the transmittance of the twist, from layer to layer becomes less effective. If any layer has molecules aligned perpendicular to the electrodes, (parallel to axis 34), the transmittance of the twist by that layer goes to zero. This has the effect of cutting the entire twist spiral into two separate parts. When this happens the molecules snap into an alignment orientation that is determined by the closes electrode. This in turn causes the twist angle distribution to transform to the ideal one shown by the solid vertical line in FIG. 7a. The foregoing describes the nature of the twist mechanism.

Next, consider the effect of the voltage on the twist of an actual device. The calculated tilt angle ($\theta$) as a function of position along the cell thickness is shwon in FIG. 7b. Close to the electrodes the tilt angle is small; but at the center of the layer it is large, because there the tilt angle is the sum of the tilts of all the molecules between the electrode surface and the center of the layer. For voltages that are just twice the threshold voltage, the tilt angle at the center of the cell is already 80°. Thus with relatively low voltages switched to the liquid crystal, the spiral can be snapped and the distribution of twist angle will be close to the ideal shown in FIG. 7a. Moreover in this near/ideal state the average tilt angle is much less than 90°. The device takes advantage of the birefringence of this state in the following manner.

The polarization of the light entering the device must be aligned along the preferred alignment direction of the entrance electrode (which in the drawings is the electrode 2) in order to make the twisted nematic off-state work. Thus when the molecules untwist, the polarization of the light would be either at 0° or at 90° (in a 90° twist cell) with respect to the majority of the liquid crystal molecules and the net birefringence effect experience by the light that passes through the layer would be very small. Given this picture, the way to maximize the birefringence (at least to first order) is to orient the preferred directions of the two electrodes at an angle of 45° with respect to each other. In this way the polarization of the light will make an angle of 45° with respect to the extra-ordinary axis of the liquid crystal throughout half of the layer. This optimizes the transmission of the device.

Figure 8:
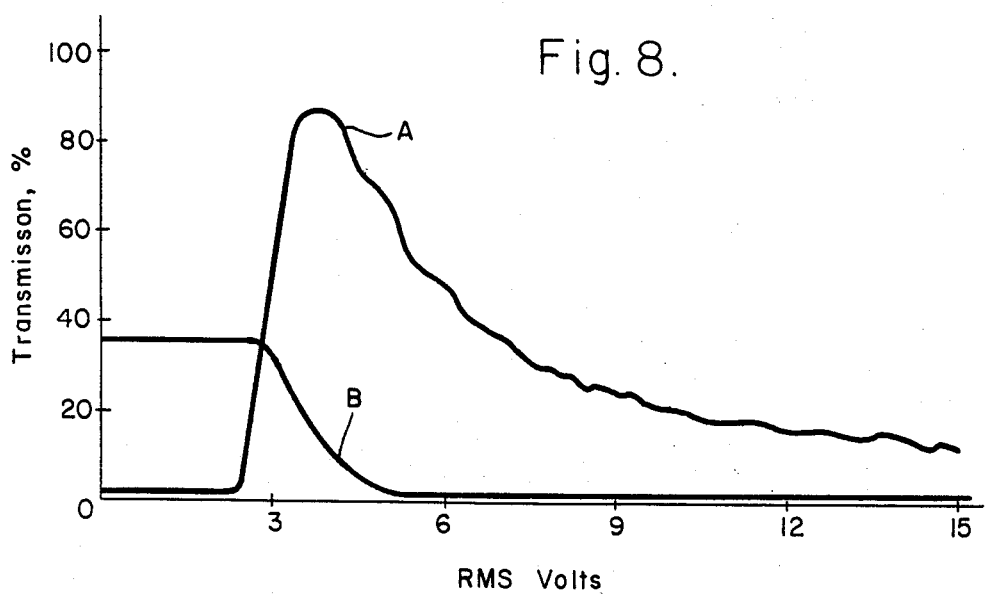
FIG. 8 is a graph showing experimental curves that characterize the hybrid field effect liquid crystal device. Curve A is a plot of the percentage of light transmission as a function of applied voltage for a 45° twist angle whereas curve B is the same function for a 90° twist angle.

In FIG. 8 there is shown an experimental curve that characterizes the hybrid field effect liquid crystal device. Curve A is for a 45° twist angle device in accordance with the present invention. Curve B is for a conventional 90° twist angle device. In FIG. 8 the X axis is used to plot rms volts whereas the Y axis is used to plot transmission percent. The data were taken with two micrometer thick, reflection mode cells filled with an ester nematic liquid crystal. The polarizer was oriented parallel to the liquid crystal optical axis on the front electrode and the analyzer was oriented perpendicular to the polarizer. The readout beam 9 was from a helium-neon laser. As expected from the above reasoning, the birefringence of the 45° cell is considerably stronger than that of the 90° cell so that the maximum transmission for the 45° cell is much larger than for the 90° cell.

Consider now the characteristic curve of the 45° device shown in FIG. 8. The curve is characterized by low operating voltage (that is, voltages below 4 volts), by the steep and linear change of the transmission as a function of the applied voltage, and by the high on-state transmission of 86 percent. These features, combined with the fast response time and the low off-state transmission, provide unique characteristics of the liquid crystal hybrid field effect mode light valve.

The sensitometry curve shown in FIG. 10 is a plot of the input light intensity as abscissa versus an ordinate showing percent tranmission for the light valve when used in a conventional 500 watt Xenon arc reflection mode projection system for use where high intensity projection light levels are needed to improve signal-two-noise thereby to assure accurate measurement. The Xenon arc lamp supplied the projection light 9 schematically indicated in FIG. 1. the illumination light 10 was filtered to simulate a P-1 phosphor; it had a central wavelength of 527.5 nm and a 50% bandwidth of 23.3 nm. The read-out or projection light 9 was filtered to a narrow spectral band centered at 615 nm to approximate Helium-neon laser emission for the purpose of these measurements. A conventional photodiode radiometric detector was used. The bias voltage applied to the light valve was 6 volts rms at 20 kHz. The rms current was measured to be 5 milliampere. To obtain the date shown in FIG. 10, we fixed and measured the light incident on the photoconductor and then we measured the read-out light transmitted from the device to the screen. These data represent one point on the curve in FIG. 11.

As can be seen from the figure, the threshold sensitivity occurs at about 3.3 $\mu$W/cm$^2$. If we use 10 millisecond for the excitation time response, we find that the threshold exposure for the device is 0.33 ergs/cm$^2$. We attribute this low input light requirement at the threshold in this particular device to the design of the CdS photoconductor that permits the main part of the input light to abe absorbed in the vicinity of the heterojunction. This particular design is set forth in the above noted Applicaton Ser. No. 625,331. This photoconductor design, however, does not form a part of the present invention since a photoconductor of the type shown in Beard U.S. Pat. No. 3,824,002 may be used where low level response is not required. Typically we operate the device at a voltage such that 100 microwatts per square centimeter is the peak input intensity. This corresponds to a maximum contrast of 90:1 for the measured device and a sensitivity of 10 ergs/cm$^2$ at maximum contrast.

In the present configuration and at its present level of development, the hybrid field effect light valve has been found to have the following performance characteristics:

| | |
|---|---|
| Aperature Size: | 1 in.$^2$ |
| Sensitivity (Full Contrast): | 160 $\mu$w/cm$^2$ at 525 nm |
| Resolution: | 60 lines/mm at 50% MTF |
| Contrast: | >100:1 |
| Grayscales: | 9 |
| Speed: | |
| Excitation (0 to 90%) | 10 msec |
| Extinction (100% to 10%) | 15 msec |

-continued

| Projection Light Throughput: | >100 mW/cm² |
|---|---|
| Reflectivity: | >90% |
| Optical Quality: | <2 wavelength curvature at 6328A |
| Voltage: | 6 $V_{rms}$ at 10 kHz ea |

The optical data processing capability of the device was established by several experiments using the light valve in the system shown in FIG. 9. This system of FIG. 9 is an improvement over the type of system shown in U.S, Pat. No. 3,744,879 issued to Terry D. Beard on July 10, 1973 and operates on the same general principles as are set forth therein and in the CODP literature cited above, with the following differences. In particular the Beard system uses a transmissive dynamic scattering light valve whereas systems using the present invention are designed to use a reflective hybrid field effect mode light valve. In FIG. 9 the light valve 15 which is connected to voltage source 16 is provided with input illumination 10 which is derived from a noncoherent light source 50 supplying light through an input transparency 51 containing signal information which is modulated onto the beam 10 which is then supplied through projection lens 52 and shutter 53 to the input side of the light valve 15.

The projection light 9 is derived from a helium neon laser 54 which supplies output through a spatial filter 55 and a recollimating lens 56 to a beam splitter 57. Beam splitter 57 sends a portion of the projection light into the light valve 15 where it is reflected by the dielectric mirror 5 and modulated in accordance with the operation of the light valve described above. Output from the light valve 15 is transmitted through beam splitter 57, through a Fourier transform lens 58, an analyaer 59, and thence to a silicon diode dectector 61 on screen 60. The portion of the beam 9 from laser 54 which is not initially reflected by beam splitter 57 is transmitted straight through to element 62 which may be an absorber or which optionally may be an interferometer mirror.

As noted above, the system of FIG. 9 operates in accordance with the same basic principles as are outlined in the Beard patend 3,744,879 to perform optical data processing of the type discussed in the introductory remarks above, but its response is much faster. By way of example, the system has been used in the following experiments. The system can be made to reverse the contrast of an image simply by changing the voltage applied to the light valve. After rotating the analyzer associated with the light valve 15 as shown in FIGS. 6a and 61 (and not otherwise separately shown in FIG. 9) from its usual perpendicular position to an angle of 22.5° to the perpendicular, only a small change of light valve bias voltage (from 5.5 volts rms to 3.6 volts rms for the case illustrated) is required to reverse the contrast of the projected image. That is to say, a photographic negative can be transferred into a positive and vice-versa. Voltages between these two extremes produce intermediate results. The intermediate states can be used for level slicing in data reduction schemes.

Another way to manipulate the contrast and the gray levels is to vary the frequency of the power supply. This changes the threshold and the slope of the response of the liquid crystal. Using this feature one can "zoom" the gray scale response of the device to examine in detail the proportions of the input image gray scale distribution. This can be a simple and useful tool for the analysis and data reduction of complex images.

The device has numerous other uses. The traditional Fourier transform operations of CODP are facilitated by use of the light valve of th present invention. The differentiation or edge enhancement of an image is also possible using known techniques. The use of the present light valve in such known techniques makes it possible to perform all of these operatons in real time in view of the improved response of the light valve. This is the real significance of the device. It offers high optical performance in real-time in systems that use spatially coherent light.

The device can be used to input noncoherently illuminated images into a coherent optical data processing system in real time. The device has impressive characteristics and because of its compact, solid-state construction and very low power and voltage requirements, it is exceptionally easy to use. It requires only a single, low voltage audio power supply. Furthermore, due to its high sensitivity to input light it can readily be driven from the conventional cathode ray tube of a television monitor.

The invention descrived above is a device which utilizes the twisted alignment effect in the off state when no voltage is applied to the liquid crystal in combination with the birefringence effect in the on state when voltage is applied to the liquid crystal. Using crossed polarizers in the incident and the reflected beams provide a dark "off state" as described above. Using a positive dielectric anisotrophy liquid crystal and applying an appripriate voltage we can change the molecular orientation to homeotropic. If the orientation of the molecules in the "on state" is changed to fully or pure homeotropic and the incident projection beam is perpendicular to the cell aperture, the effective birefringence of the liquid crystal is zero because the polarization of the light is perpendicular to the optical axis of the liquid crystal. Two means can be used to increase the birefringence in this "on state". As has been pointed out above, instead of using the conventional 90° twist that is characteristic of twisted nematic liquid crystal devices, one can use a 45° twist. As the twist angle is smaller, the aligning forces of the two electrodes are closer to parallel, thus their influence is larger. As a result, the orientation of the molecules in the on state is not pure homeotropic but tilted as shown in FIGS. 6a and 6b. Making the cell very thin further increases the boundary forces and improves the response time. We have found that the 45° twist is optimum to satisfy the trade-off between the strength of the aligning forces and the intensity of the birefringent response.

In order to increase the birefringence of the on state even further, one can illuminate the cell with an off-axis projection beam. The device described above has so far assumed a perpendicular angle of incidence of the projection on the face of the liquid crystal cell. When the incident light angle is other than perpendicular, the effective birefringence is not zero even when the molecular orientation is ideal or pure homeotropic. On the other hand, no significant change is observed in the twisted nematic behavior if the incident angle is smaller than 20° to 30°. Combining these two improvement features, that is, a 45° twist angle and an off axis projection light beam of less than 20° to 30° to the perpendicular, results in very good contrast and high speed.

Thus there has been described a liquid crystal light valve particularly suited for optical data processing and which in the off state utilizes the twisted nematic alignment twisted to an angle of preferably 45° and in the on state utilizes the birefringence effect of the liquid crystal. In order to increase the birefringence in the on state to a value greater than is provided even by the 45° twist angle, the device can be used with off-axis incidence of the read out light beam.

What is claimed is:

1. In a reflective mode alternating current driven liquid crystal light valve of the type having first and second parallel opposed transparent electrode means for application of an alternating electric field across first and second parallel opposed transparent insulating layers which are positioned between and parallel to said first and second electrode means to define in cooperation with an annular spacer member separating said first and second insulating layers an enclosed space containing nematic liquid crystal material, said light valve further having photoconductor means and mirror means positioned between said second transparent electrode and said second transparent insulating layer, said photoconductor means being positioned to receive input writing signal light through said second transparent electrode to spatially and temporally vary the magnitude of said electrode field applied across said liquid crystal material as a function of the intensity of said writing light, the hybrid filed effect mode improvement comprising:
    a. means operatively associated with the first of said transparent insulating layers in the absence of an electric field for aligning the axes of the molecules of a first portion of said liquid crystal material adjacent to said first layer in a first direction in a plane which is parallel to said first layer;
    b. means operatively associated with the second of said transparent insulating layers in the absence of an electric field for aligning the axes of the molecules of a second portion of said liquid crystal material which is adjacent to said second layer in a second direction in a plane which is parallel to said second layer, the respective orthogonal projections of said first and second directions in any plane which is between and parallel to both said first and second planes intersecting at an acute angle for producing a twisted alignment of the axes of said nematic liquid crystal molecules in the absence of said electric field and a tilted orientation of said axes in the presence of said electric field;
    c. means for providing polarized projection light through said first transparent electrode and said first transparent insulating layer to traverse said liquid crystal material contained between said first and second insulating layers and be reflected by said mirror means to re-traverse said liquid crystal material and exit through said first transparent electrode of said light valve, said polarized projection light being subject to changes in polarization state as it traverses said layer of liquid crystal material in both directions, said polarization sate being rotated by said twisted nematic alignment of said molecules of said liquid crystal material in the off state of said field and by the birefringence of said tilted oreintation of said molecules of said liquid crystal material in the on-state of said field; and,
    d. means positioned to intercept said light exiting from said first transparent electrode means for blocking all of said projection light exiting from said light valve except that which is in a predetermined polarization state.

2. A device as in claim 1 wherein said acute angle between said first and second alignment directions is substantially 45°.

3. A device as in claim 1 wherein said projection light passes through said first transparent insulating layer at an acute incidence angle to the normal thereto, said normal being the optic axis of said light valve.

4. A device as in claim 3 wherein said acute angle between said first and second alignment directions is substantially 45°, and wherein said acute incidence angle is less than 35°.

5. A device as in claim 1 wherein said means for blocking said projection light exiting from said light valve comprises a linear polarizer, the polarization axis of said polarizer making an angle with the axis of polarization of said polarized projection light entering said light valve which is equal to ninety degrees with respect to the polarizing direction of said polarized projection light.

6. A device as in claim 1 wherein said liquid crystal material has a thickness substantially equal to two micrometers.

7. A device as in claim 1 wherein the thickness of said liquid crystal material has a variation of less than 0.25 micrometers across its surface.

8. A device as in claim 1 wherein both said means for aligning the axes of the molecules of said liquid crystal material are formed at least in part by grazing angle deposition of said insulating layers respectively in the direction in whih molecules adjacent to said layer are to be aligned.

9. A device as in claim 1 wherein said liquid crystal material is of positive dielectric anisotrophy.

10. In a high performance reflective mode liquid crystal light valve of the type having means for confining a layer of positive dielectric anisotropy nematic liquid crystal material between opposed plane parallel surfaces, means for establishing a spatially and temporally modulated electric field across said liquid crystal layer orthogonally to said surfaces in response to input signals, means for providing polarized projection light to one side of said layer of liquid crystal material and means for reflecting said polarized projection light from the other side thereof back through said liquid crystal material, the improvement comprising:
    a. means operative in the absence of said electric field for aligning the axes of the molecules of a first portion of said liquid crystal material adjacent to one of said surfaces in a first direction in a first plane which is parallel to said one surface;
    b. means operative in the absence of an electric field for aligning the axes of the molecules of a second portion of said liquid crystal material which is adjacent to the other of said surfaces in a second direction in a second plane which is parallel to said other surface, the respective orthogonal projections of said first and second directions in any plane which is between and parallel to both said first and second planes intersecting at an acute angle for producing a twisted alignment of the axes of said nematic liquid crystal molecules about an axis of rotation which is orthogonal to said parallel surfaces in the absence of said electric field and a tilted orientation of said axes with respect to said opposed plane parallel surfaces in the presence of said electric field;

c. said twisted and tilted orientations of said axes of the molecules in said layer of liquid crystal material subjecting said polarized projection light as it traverses through said layer to said reflection means and thence back through said layer to changes in polarization state in both directions, said polarization state being rotated by said twisted nematic alignment of said molecules of said liquid crystal material in the OFF state of said field and by the birefringence of said tilted orientation of said molecules in said liquid crystal material in the ON state of said field; and d. means positioned to intercept said light exiting from said first transparent electrode means for blocking all of said projection light exiting from said light valve except that which is in a predetermined polarization state.

* * * * *